(12) United States Patent
Kim

(10) Patent No.: US 7,184,783 B1
(45) Date of Patent: Feb. 27, 2007

(54) METHOD AND SYSTEM FOR TRANSMITTING CHARACTER MESSAGES IN MOBILE COMMUNICATION TERMINAL DURING CONVERSATION BY TELEPHONE

(75) Inventor: Soon-Jin Kim, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/473,360

(22) Filed: Dec. 28, 1999

(30) Foreign Application Priority Data

Dec. 30, 1998 (KR) .............................. 1998-60718

(51) Int. Cl.
*H04Q 7/20* (2006.01)

(52) U.S. Cl. .................... 455/466; 455/511; 455/412.1

(58) Field of Classification Search ................ 455/557, 455/412, 414, 466, 566, 412.2, 414.1, 414.4, 455/550.1, 567, 511; 704/208–210
See application file for complete search history.

(56) References Cited

U.S. PATENT DOCUMENTS 5,590,406 A   12/1996 Bayley et al.
5,687,216 A * 11/1997 Svensson ................ 379/357.02
6,208,878 B1 *  3/2001 Hattori et al. .............. 455/566
6,259,934 B1 *  7/2001 Guerlin ...................... 455/566
6,301,338 B1 * 10/2001 Makela et al. ........... 379/88.21
6,351,495 B1 *  2/2002 Tarraf ......................... 375/259
6,385,585 B1 *  5/2002 Jonsson et al. ............. 704/275

* cited by examiner

*Primary Examiner*—Edward F. Urban
*Assistant Examiner*—Tu X. Nguyen
(74) *Attorney, Agent, or Firm*—The Farrell Law Firm

(57) ABSTRACT

A method for transmitting a character message in a mobile communication terminal during a conversation by telephone comprises the steps of setting the mobile communication terminal to a character message-transmitting/receiving mode. The character message-transmitting/receiving mode is set while in a state in which a speech path has been established between the mobile communication terminal and a mobile communication terminal of a party other than the user. A character message is input at the mobile communication terminal by the user while in the character message-transmitting/receiving mode. Also while in the character message-transmitting/receiving mode, the mobile communication terminal processes the written character message and transmits the written character message to the mobile communication terminal of the other party via the established speech path.

5 Claims, 2 Drawing Sheets

METHOD AND SYSTEM FOR TRANSMITTING CHARACTER MESSAGES IN MOBILE COMMUNICATION TERMINAL DURING CONVERSATION BY TELEPHONE

BACKGROUND OF THE INVENTION

1. Field of the Invention

The present invention relates to a Short Message Service (SMS) of mobile communication terminals, and more particularly to a method for transmitting a character message in mobile communication terminals during a conversation by telephone.

2. Description of the Related Art

In general, Short Message Service (SMS) refers to a personal communication service of a kind which allows for communication of voice or character messages between mobile communication terminals of GSM (Global System for Mobile Communication), CDMA, or PCS types. Short Message Service is used, for example, when direct communication by telephone between users of mobile communication terminals is impossible or inconvenient. For example, the user of the mobile communication terminal of the calling and/or called party may be located where he or she has difficulty communicating by telephone, as in a conference hall, where carrying on a voice conversation would be disruptive, or where there are privacy concerns. Although a mobile communication terminal of a called party may receive an incoming call from a mobile communication terminal of a calling party, the called party may have difficulty speaking directly by telephone with the calling party in response to the reception of the incoming call. Also, for example, where an emergency call is required, although the mobile communication terminal of the calling party may transmit an outgoing call to the called party terminal to establish a speech path or a channel, the calling party may have difficulty in directly speaking by telephone with the called party. In such cases, the mobile communication terminals of the calling and called parties may resort to transmitting and receiving character messages by using the SMS. Accordingly, the calling and called parties can communicate with each other using character messages even though those character messages are limited in length.

However, the prior art SMS makes it impossible to transmit or receive a character message during the conversation by telephone between the mobile communication terminals of the calling and called parties. That is, SMS is a personal communication service for exchanging messages between the calling and called parties who have trouble speaking directly by telephone, but it is relatively limited because it is not supported during a telephone conversation. For this reason, the users suffer an inconvenience of always having to access SMS always after hanging up the receiver while conducting a conversation by telephone when it becomes necessary to send a character message.

SUMMARY OF THE INVENTION

Therefore, an object of the invention is to provide a method for transmitting a character message in mobile communication terminals by using SMS during a telephone conversation.

In accordance with one embodiment of the present invention, a method for transmitting a character message in a mobile communication terminal during a conversation by telephone comprises the steps of setting the mobile communication terminal to a character message-transmitting/receiving mode. The character message-transmitting/receiving mode is set while in a state in which a speech path has been established between the mobile communication terminal and a mobile communication terminal of a party other than the user. A character message is input at the mobile communication terminal by the user while in the character message-transmitting/receiving mode. Also while in the character message-transmitting/receiving mode, the mobile communication terminal processes the written character message and transmits the written character message to the mobile communication terminal of the other party via the established speech path.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 1:
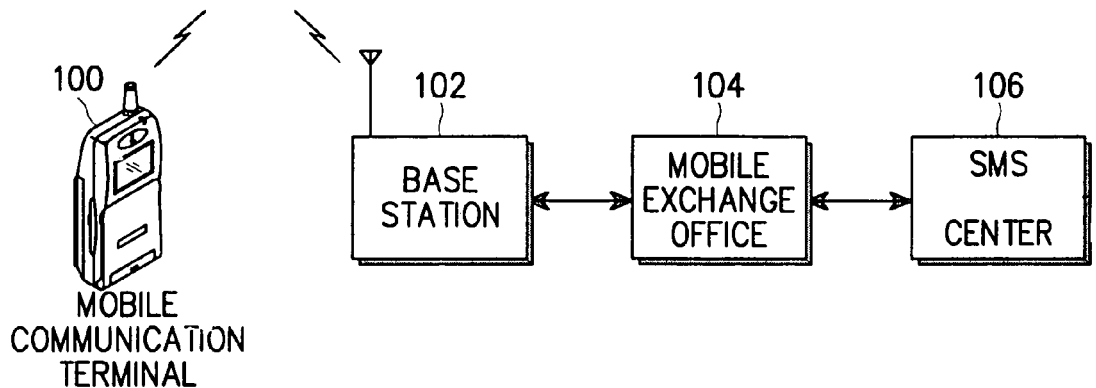
FIG. 1 is a block diagram illustrating the construction of an SMS system of a mobile communication terminal which supports the present invention.

Referring to FIG. 1, when a character message originates from a mobile communication terminal 100, the character message is received by base station 102 and sent to a mobile exchange office 104. The mobile exchange office 104 informs the mobile communication terminal 100 of the reception of the character message and transmits the received character message to an SMS center 106 for further processing. SMS center 106 is also connected to other mobile exchange offices (not shown), Public Switched Telephone Networks (PSTNs) and/or Integrated Service Digital Networks (ISDNs). The SMS center 106 receives a character message from one mobile exchange office or network, stores the received character message in a digital form, and transmits the stored character message back to mobile exchange office 104, or to a different mobile exchange office, a PSTN or a ISDN for further transmission on to the destination mobile communication terminal, i.e., the terminal to which the originating mobile communication terminal 100 directed the character message.

Figure 2:
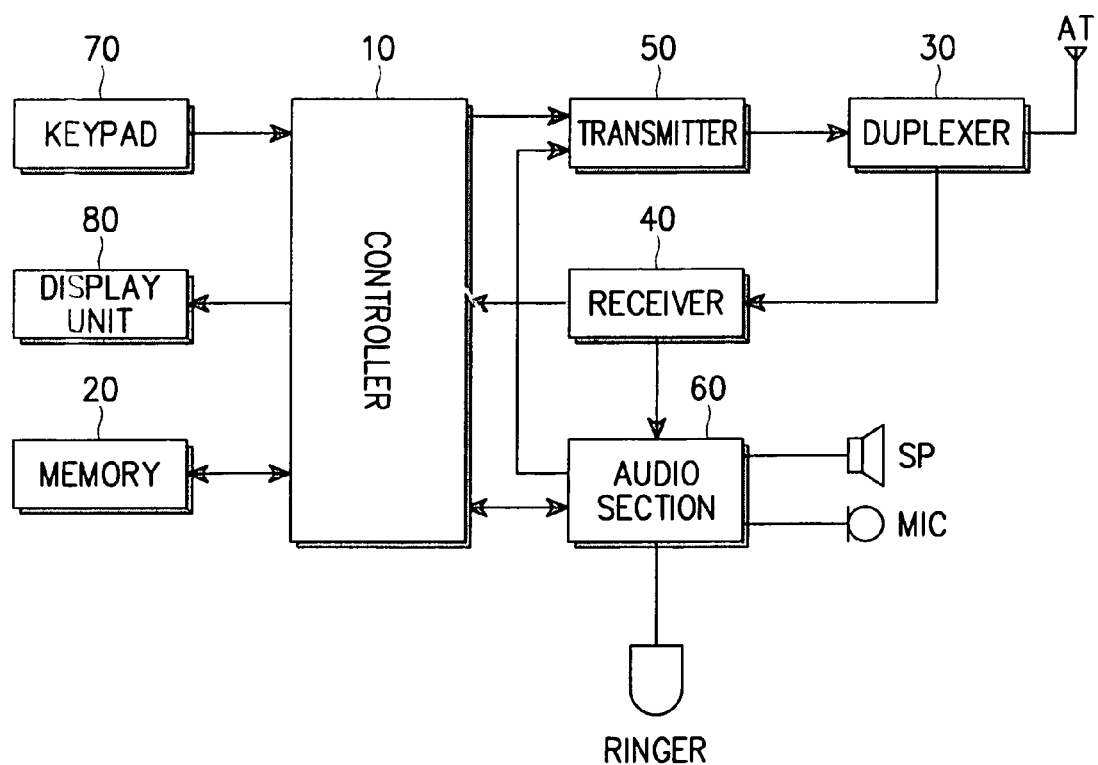
FIG. 2 is a block diagram illustrating the construction of a mobile communication terminal which supports the present invention.

FIG. 2 is a block diagram illustrating the construction of a mobile communication terminal, such as mobile communication terminal 100, which supports the present invention. Controller 10 controls the overall operation of the mobile communication terminal 100. A memory 20 that interfaces with controller 10 stores an operating program for controlling the overall operation of the mobile communication terminal. The memory 20 also stores input and output data generated during operation of the mobile communication terminal.

Character message data transmitted to the mobile communication terminal is also stored in the memory 20 at a predetermined memory location. Duplexer 30 conducts a signal separation for transmitting and receiving signals and transmits and receives signals to and from antenna AT (which transmits and receives signals to and from a base station). A receiver 40 receives a radio signal received via the antenna AT and separated by the duplexer 30 under the control of the controller 10. The receiver 40 amplifies the received radio signal, and then outputs the amplified radio signal after filtering it. A transmitter 50 receives a radio signal outputted from an audio section 60, which will be described hereinafter. Under the control of the controller 10, the transmitter 50 filters and amplifies the received radio signal. The radio signal from the transmitter 50 is sent to the duplexer 30 which, in turn, transmits the radio signal from the mobile communication terminal via the antenna AT.

Audio section 60 modulates an audio signal, inputted thereto via a microphone MC, into a radio signal for application to the transmitter 50 under the control of the controller 10. The audio section 60 also demodulates a radio signal supplied from the receiver 40, and outputs the demodulated radio signal as an audio signal to a speaker SP. The audio section 60 also detects a ring signal generated from the base station and received via the receiver 40, and outputs it to a ringer.

A keypad 70, which includes numeral keys and other function keys, interfaces with the controller 10. Keypad 70 generates key data in response to depressing of one or more of the keys by a user, which is input to the controller 10. The controller 10 uses the data input in carrying out various functions and operations. A display unit 80, which interfaces with the controller 10, includes a Liquid Crystal Display (LCD) adapted to display various information thereon. Key data generated from the keypad 70 and a variety of information signals generated from the controller 10 may also be supplied to the display unit 80, which displays the key data and information signals.

Figure 3:
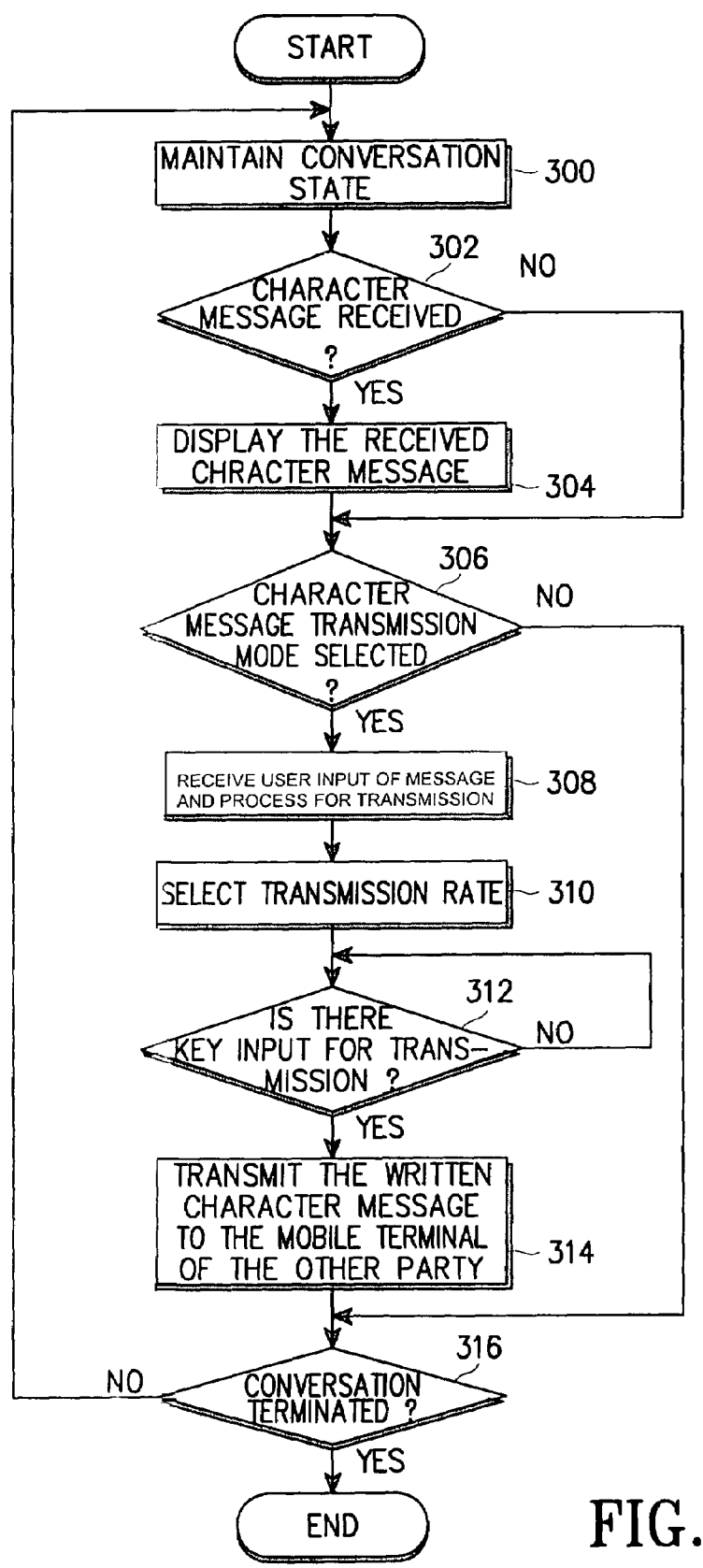
FIG. 3 is a flowchart illustrating transmission and reception of character messages conducted in the mobile communication terminal of FIG. 2 during a telephone conversation in accordance with a preferred embodiment of the present invention.

FIG. 3 is a flowchart illustrating the procedure for transmission and reception of character messages carried out in the mobile communication terminal 100 during a telephone conversation in accordance with a preferred embodiment of the present invention. The procedure of FIG. 3 is programmed in the memory 20 and is executed by the controller 10 of FIG. 2.

The procedure for transmission and reception of character messages carried out in the mobile communication terminal 100 is described hereinafter with reference to FIGS. 1 to 3. For the description, two parties, one of who is the user of the mobile communication terminal 100, are registered to the Short Message Service (SMS) service. It is understood that, for the following description, both mobile communication terminals (and associated base stations and other interposed telecommunications architecture) are maintained in a state in which speech paths or channels for a conversation by telephone are still established when character messages are also transmitted.

As shown in FIG. 3, once established, the controller 10 maintains the conversation state between the mobile communication terminal 100 and the other party at step 300. The controller 10 then checks at step 302 whether or not mobile communication terminal 100 has received a character message from the mobile communication terminal of the other party. If not, the program proceeds to step 306, described below. If it is determined at step 302 that the mobile communication terminal 100 has received a character message via the receiver, the program proceeds to step 304, wherein the controller 10 displays the character message received via the receiver 40 on the display unit 80. Accordingly, the user of the mobile communication terminal 100 may read the content of the received character message during a conversation by telephone with the other party.

At step 306, if the user of mobile communication terminal 100 wants to transmit a character message to the other party, he can set a character message-transmitting mode in the mobile communication terminal 100 by pressing a character message-transmitting mode key on keypad 70. The character message-transmitting mode enables transmission of a character message during a conversation by telephone. The character message-transmitting mode key may be a separate key included in the keypad 70, or may alternatively be selected via a combination of existing keys on the keypad 70. After the controller 10 sets the character message-transmitting mode, it waits for the user to input a character message to be transmitted to the mobile communication terminal of the other party. The program proceeds to step 308 where the controller 10 receives a character message input by the user via the keys on the keypad 70.

The user of the mobile communication terminal 100 also selects a desired transmission rate for the character message written via the keypad 70. At step 310, the controller 10 sets the transmission rate for the character message to be the transmission rate selected. The program proceeds to step 312, where the controller 10 determines whether or not the user has provided an input (via keypad 70) signaling for transmission of the written character message. If it is detected at step 312 that there is input signaling for transmission of the written character message, the program proceeds to step 314 where the controller 10 controls the transmitter 50 to transmit the written character message to the mobile communication terminal of the other party. At subsequent step 316, the controller determines whether or not the conversation by telephone is terminated. If it is determined at step 316 that the conversation by telephone is not terminated, the program returns to step 300, and repeats steps 300 to 316 during the telephone conversation.

As apparent from the above description, according to the present invention it is possible transmit and receive character messages between mobile communication terminals during a conversation by telephone. Therefore, even in the case where conversation between the parties is difficult or inconvenient, they can communicate with each other using character messages transmitted via a speech path for the telephone conversation.

While this invention has been described in connection with what is presently considered to be the most practical and preferred embodiment, it is to be understood that the invention is not limited to the disclosed embodiments, but is intended to cover various modifications within the spirit and scope of the appended claims.

What is claimed is:

1. A method for transmitting a character message in a mobile communication terminal while maintaining a conversation by telephone, comprising the steps of:

setting the mobile communication terminal to a character message-transmitting/receiving mode while in a state in which a speech path has been established between the mobile communication terminal and a mobile communication terminal of a party other than the user; and inputting a character message while in the character message-transmitting/receiving mode, processing the written character message and thereafter setting by a user a transmission rate and transmitting the written character message to the mobile communication terminal of the other party via the established speech path in the character message-transmitting/receiving mode.

2. The method in accordance with claim 1, further comprising the step of:

returning the mobile communication terminal of the user to a phone mode after the transmission of the character message to the mobile communication terminal of the other party.

3. The method in accordance with claim 1, wherein the character message input during the character message-transmitting/receiving mode is selected among character messages previously written and stored in a registered state.

4. The method in accordance with claim 1, including the additional step of receiving a character message from the mobile communication terminal of the other party via the established speech path while the mobile communication terminal is in the character message transmitting/receiving mode, the mobile communication terminal displaying the received character message.

5. A method for receiving a character message in a mobile communication terminal while maintaining a conversation by telephone, comprising the steps of:

establishing a speech path between the mobile communication terminal and a mobile communication terminal of another party;

receiving a character message transmitted at a predetermined transmission rate from the mobile communication terminal of the other party via the speech path, the predetermined transmission rate being determined by the user of the other party; and processing and displaying the received character message.

* * * * *